United States Patent [19]

Kaneko et al.

[11] Patent Number: 5,313,871
[45] Date of Patent: May 24, 1994

[54] HYDRAULIC CONTROL SYSTEM UTILIZING A PLURALITY OF BRANCH PASSAGES WITH DIFFERING FLOW RATES

[75] Inventors: Hitoshi Kaneko; Shunichi Ichikawa, both of Tokyo, Japan

[73] Assignee: Pioneer Electronic Corporation, Tokyo, Japan

[21] Appl. No.: 850,362

[22] Filed: Mar. 12, 1992

[30] Foreign Application Priority Data

Jul. 17, 1991 [JP] Japan .................................. 3-202436

[51] Int. Cl.$^5$ ............................................. F15B 13/16
[52] U.S. Cl. ....................................... 91/361; 91/392; 137/599; 137/601
[58] Field of Search ..................... 91/361, 459, 363 R, 91/392, 410, 462; 60/494; 137/599, 596.17, 552.5, 601

[56] References Cited

U.S. PATENT DOCUMENTS

| | | | |
|---|---|---|---|
| 2,825,306 | 3/1958 | Buri | 91/459 |
| 3,010,316 | 11/1961 | Snyder | 137/599 |
| 3,081,942 | 3/1963 | Maclay | 137/599 |
| 3,176,714 | 4/1965 | Smith et al. | 137/552.5 |
| 4,020,862 | 5/1977 | Bohnlein et al. | 137/601 |
| 4,030,523 | 6/1977 | Cram et al. | 137/599 |
| 4,518,011 | 5/1985 | Stoll | 137/596.17 |

FOREIGN PATENT DOCUMENTS

| | | | |
|---|---|---|---|
| 0111637 | 6/1984 | European Pat. Off. | |
| 0068389 | 6/1978 | Japan | 91/361 |
| 56-105102 | 8/1981 | Japan | |

Primary Examiner—Edward K. Look
Assistant Examiner—Hoang Nguyen
Attorney, Agent, or Firm—Nikaido, Marmelstein, Murray & Oram

[57] ABSTRACT

A hydraulic control system for controlling an actuator has a cylinder and a piston, and an oil pump. A first passage is communicated with the oil pump, and a second passage is communicated with the cylinder of the actuator. A plurality of branch passages are connected in parallel between the first and second passages, and a valve is provided in each branch passage. The hydraulic control system has a flow rate setting device for operating each valve thereby applying a predetermined quantity of oil to the cylinder of the actuator to shift the piston a desired distance.

4 Claims, 5 Drawing Sheets

HYDRAULIC CONTROL SYSTEM UTILIZING A PLURALITY OF BRANCH PASSAGES WITH DIFFERING FLOW RATES

BACKGROUND OF THE INVENTION

The present invention relates to a system for hydraulically controlling an actuator such as an oil hydraulic cylinder having a piston.

The hydraulic cylinder is applied with pressurized oil from a pump driven by a motor, thereby causing the piston to be continuously and effectively shifted a distance dependent on quantity of oil supplied to the cylinder.

Japanese Patent Application Laid-Open 56-105102 discloses a hydraulic control system of an actuator for controlling the moving distance of the piston. Referring to FIG. 6, an actuator 1 has a piston 1a which reciprocates in a cylinder comprising two chambers defined by the piston 1a. Each of the chambers is communicated with a servo valve 12 through which oil is supplied. The servo valve 12 is controlled by an electronic control system having an servo amplifier 18. The servo amplifier 18 which is applied with an input signal el from an adder 9 is connected to a manually operated changeover switch 17 for selectively connecting the servo amplifier with a loop gain setting resistor 13 for controlling load exerted on the piston 1a of the actuator, or a loop gain setting resistor 15 for controlling moving distance of the piston 1a, in accordance with the position of the contact of the switch 17. The resistor 13 and 15 are connected to the servo valve 12 through amplifiers 14 and 16, respectively. By operating the switch 17, either the moving distance or the load of the actuator 1 is controlled.

The servo amplifier 18 is adjusted to nonlinearly produce an appropriate output signal e0 in accordance with the input signal el from the adder 9. The servo valve 12 is adapted to be operated to supply an appropriate quantity of oil to one of the chambers in accordance with a current i corresponding to the signal e0 applied from the amplifier 14 or 16.

The electronic control system is provided with a feedback control system comprising a moving distance detector 2 for sensing the actual moving distance of the piston 1a and a load detector 3 for sensing the actual load exerted on the piston 1a. The detector 2 is connected to an amplifier 7 through a variable resistor 6 and the detector 3 is connected to an amplifier 5 through a variable resistor 4. The amplifiers 5 and 7 are connected to the adder 9 through a changeover switch 8 which is operatively connected to the changeover switch 17 to be operated in synchronism therewith. An input signal representing a desired moving distance or a desired load applied to the adder 9 is compared with the signal from the detector 2 or 3. The difference between the signals is fed to the servo amplifier 18 to further control the piston 1a, thereby decreasing the deviation. Hence, the control system can accurately and stably control the actuator 1 with a servomechanism.

However, the servo valve is extremely expensive so that the manufacturing cost of the system is increased. In addition, the adder and the servo amplifier must be adjusted to obtain preferable operational characteristics thereof, the operation of which is complicated, so that the actuator cannot be accurately controlled.

SUMMARY OF THE INVENTION

An object of the present invention is to provide an inexpensive hydraulic control system for easily and accurately controlling an actuator.

According to the present invention, there is provided a hydraulic control system for controlling an actuator having a cylinder and a piston, the system having an oil pump, a first passage communicated with the oil pump, a second passage communicated with the cylinder of the actuator, comprising a plurality of branch passages parallely connected between the first and second passage, and a valve provided in each branch passage. The hydraulic control system has a flow rate setting means for operating each valve thereby applying a predetermined quantity of oil to the cylinder of the actuator to shift the piston a desired distance.

Thus, by operating the valves, the moving distance of the piston can be controlled. Since expensive elements such as a servo valve are not used, the manufacturing cost of the control system is decreased. The flow rate setting means is electronically operated to precisely control the flow rate, so that adder and servo amplifier which were necessary in a conventional system can be obviated, thereby simplifying the operation.

The other objects and features of this invention will become understood from the following description with reference to the accompanying drawings.

DETAILED DESCRIPTION OF THE PREFERRED EMBODIMENTS

Figure 1:
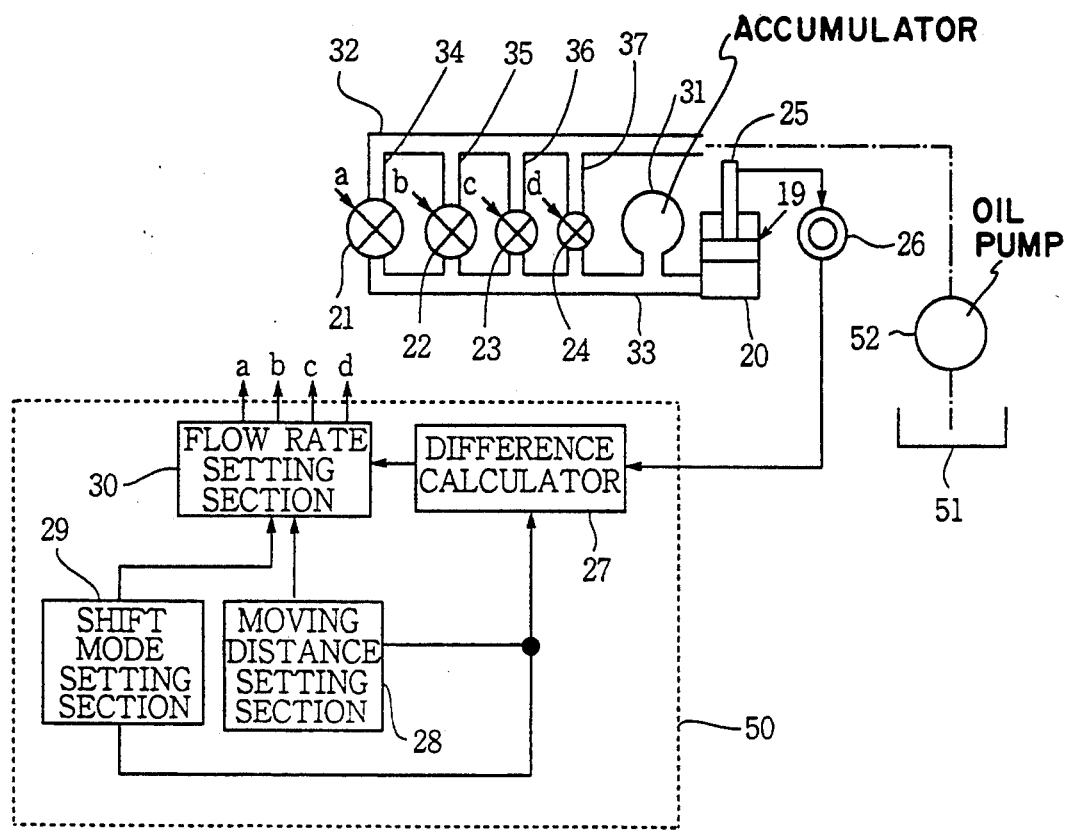
FIG. 1 shows a hydraulic circuit for an actuator and a block diagram of an electronic control system for controlling the hydraulic circuit in accordance with the present invention.

Referring to FIG. 1, an actuator 19 to which the present invention is applied has a cylinder 20 and a piston 25 which reciprocates in the cylinder 20. A hydraulic circuit of the actuator 19 comprises a first passage 32 communicated with an oil reservoir 51 through an oil pump 52, a second passage 33 connected to the cylinder 20 of the actuator 19, and four branch passages 34, 35, 36 and 37 parallely connected to the first and second passages 32 and 33. The branch passages 34, 35, 36 and 37 have electromagnetic valves 21, 22, 23 and 24, respectively. An accumulator 31 is provided in the passage 33 so as to restrain an abrupt change in the flow rate when the valves 21 to 24 are operated.

The magnetic valves 21 to 24 are selectively opened in accordance with the output signal from a control unit 50. The opening degrees of the valves 21 to 24 are set to a ratio of 8:4:2:1, so that, since the diameters of the branch passages are all the same, the flow rates of the oil which passes through the branch passages are also in the ratio 8:4:2:1.

The piston 25 is connected to a rotary encoder 26 for photoelectrically detecting an actual moving distance of the piston 25 and converting an analog signal representing the distance to a binary digital signal, which is fed to the control unit 50.

The control unit 50 has a moving distance setting section 28 where a moving distance L of the piston 25 is determined. A shift mode setting section 29 determines a mode in which the piston 25 is to be shifted. The piston 25 may be shifted to linearly increase the distance, as shown by a line A, or nonlinearly as shown by lines B and C in the graph of FIG. 2. The output signals of the moving distance setting section 28 and the shift mode setting section 29 are applied to a flow rate setting section 30 which applies digital control signals a, b, c and d to the respective electromagnetic valves 21, 22, 23 and 24 to open the valves. Thus oil is supplied through the passage 32, at least one of the branch passages 34 to 37 and the passage 33 to the cylinder 20, thereby shifting the piston 25 the distance L.

The flow rate setting section 30 is also provided with a difference signal from a difference calculator 27 which is supplied with the actual moving distance from the rotary encoder 26, desired distance L from the distance setting section 28, and the shift mode from the shift mode setting section 29. The difference calculator 27 calculates a deviation of the actual moving distance from a desired distance during a predetermined time period determined in accordance with the set mode. A deviation signal is fed to the flow rate setting section 30 so that the electromagnetic valves 21 to 24 are further controlled to accurately shift the piston 25 the desired distance L.

Figure 2:
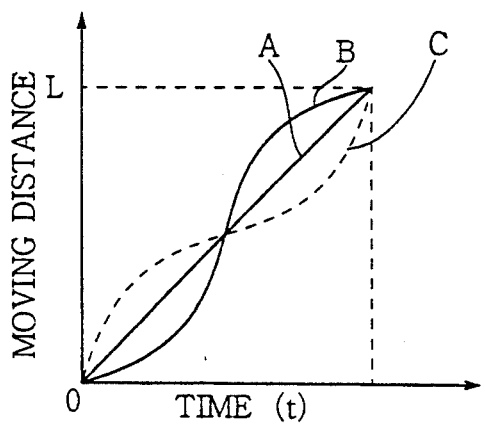
FIG. 2 is a graph showing shift modes of the actuator shown in FIG. 1.

In operation, the distance setting section 28 determines the moving distance L of the piston 25 of the actuator 19, and the shift mode setting section 29 sets a mode, for example the mode B shown in FIG. 2. The flow rate setting section 30 determines the flow rate of the oil applied to the cylinder for moving the piston 25 the determined distance L in the mode B. The flow rate setting section 30 further determines an operating mode in which the electromagnetic valves 21 to 24 are opened, and applies digital control signals a to d to the valves accordingly. Thus, the valves 21 to 24 are opened one at a time thereby communicating the passage 32 and the passage 33 through one of the branch passages 34 to 37 to apply an appropriate quantity of oil to the cylinder 20. Hence the piston 25 is shifted nonlinearly in the mode B by the oil applied to the cylinder 20.

The rotary encoder 26 detects the actual moving distance of the piston 25 at a predetermined interval and applies a binary digital signal representing the actual moved distance to the difference calculator 27. The difference calculator 27 compares the actual distance with the desired distance corresponding to the mode B to obtain a difference between the actual and desired distances per a predetermined time period. The difference signal is applied to the flow rate setting section 30, thereby correcting the operating mode of the valves 21 to 24. The control signals a, b, c and d are accordingly fed to the valves, so that the moving distance of the piston 25 is accurately controlled to coincide with the desired distance set in accordance with the mode B. The operation is repeated until the actual moving distance of the piston 25 reaches the desired distance L, whereby the flow rate setting section 30 stops applying the control signals a to d, to close all of the electromagnetic valves 21 to 24.

Thus the flow rate of the oil applied to the cylinder 20 is precisely controlled by operating the electromagnetic valves 21 to 24 without using an expensive element such as a servo valve so that the cost of the system can be decreased. The electronically controlled electromagnetic valves renders it unnecessary to provide an adder and servo amplifier which must be adjusted to set the operating characteristics thereof.

The encoder 26 provided in the present invention for detecting the moving distance of the piston may be other encoders such as a linear encoder, or those operated by magnets and electromagnetic induction.

The number or electromagnetic valves may be less than three or more than five, and the ratio of the opening degree of the valves may differ from 8:4:2:1. When the number of the valves is increased and the opening degree of each valve determined accordingly, the actuator can be controlled more accurately. The present invention may be further modified to correct the actual moving distance in accordance with the desired quantity L with a single operation without correcting the moving distance at the predetermined interval. The present invention may be applied to a hydraulic system of an actuator for controlling a load applied to the actuator.

Figure 3:
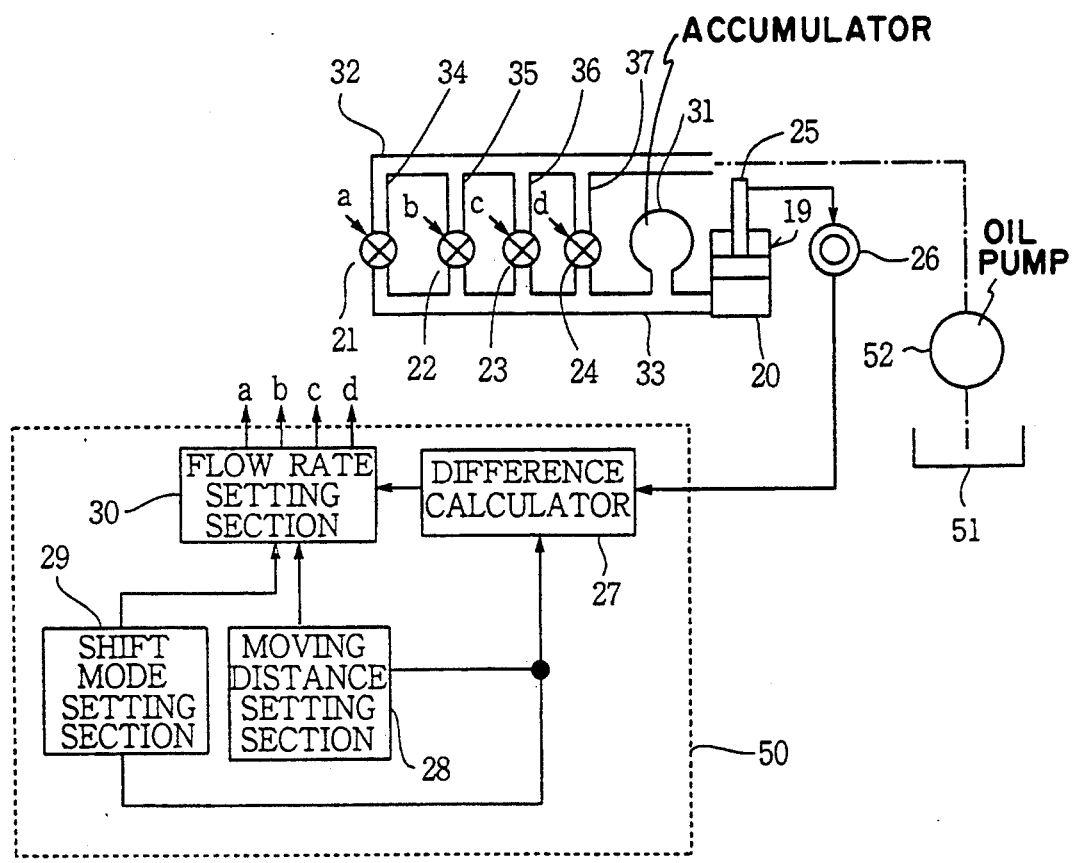
FIGS. 3 to 5 show modifications of the hydraulic circuit of FIG. 1.
Figure 4:
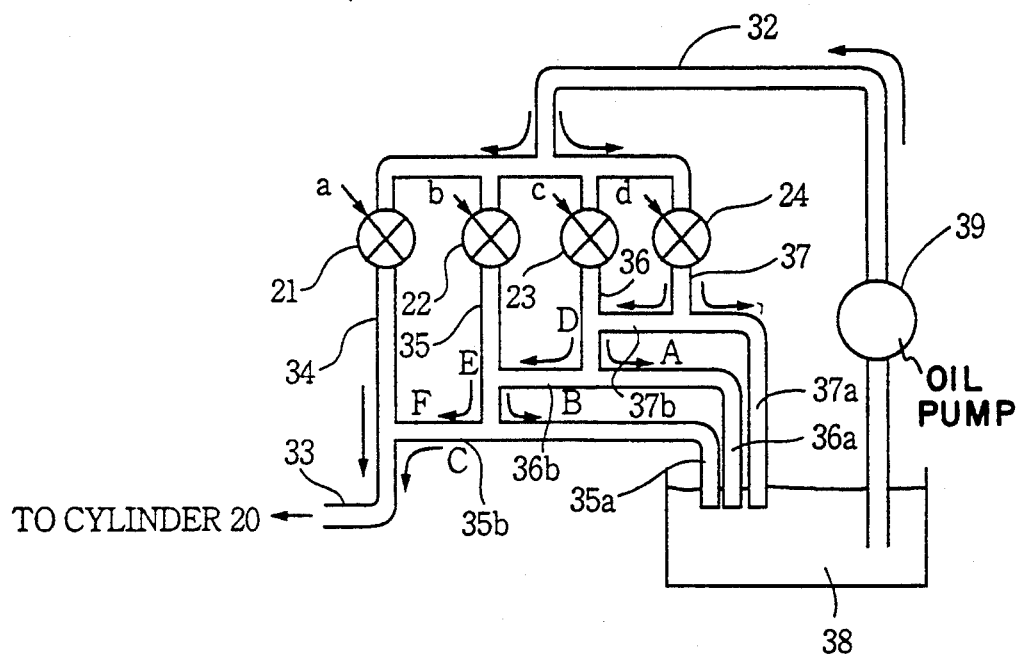
Figure 5:
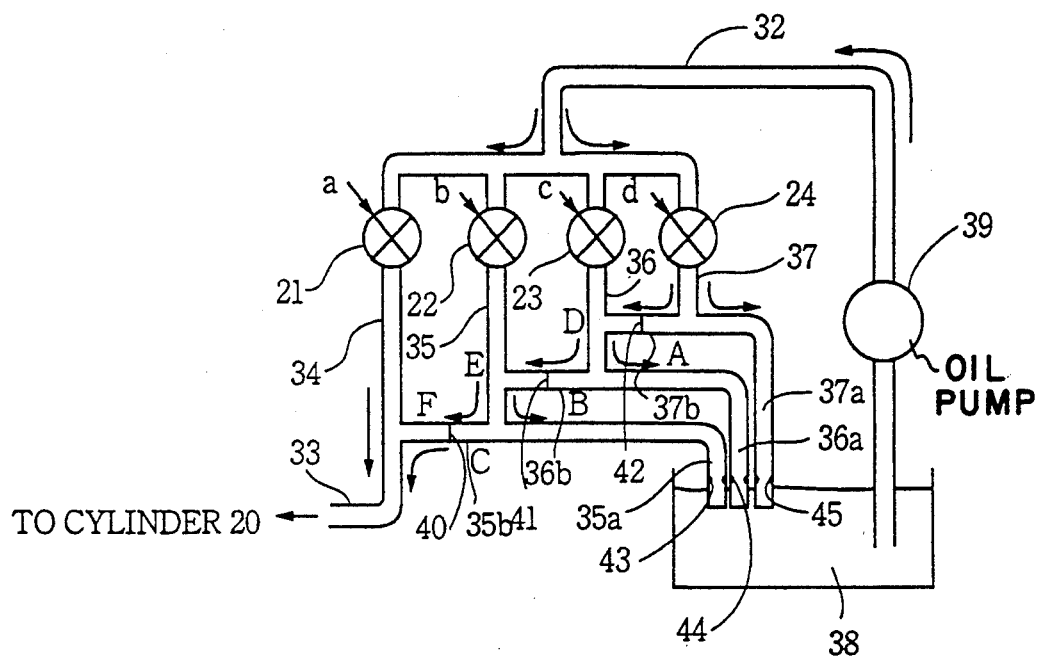
Figure 6:
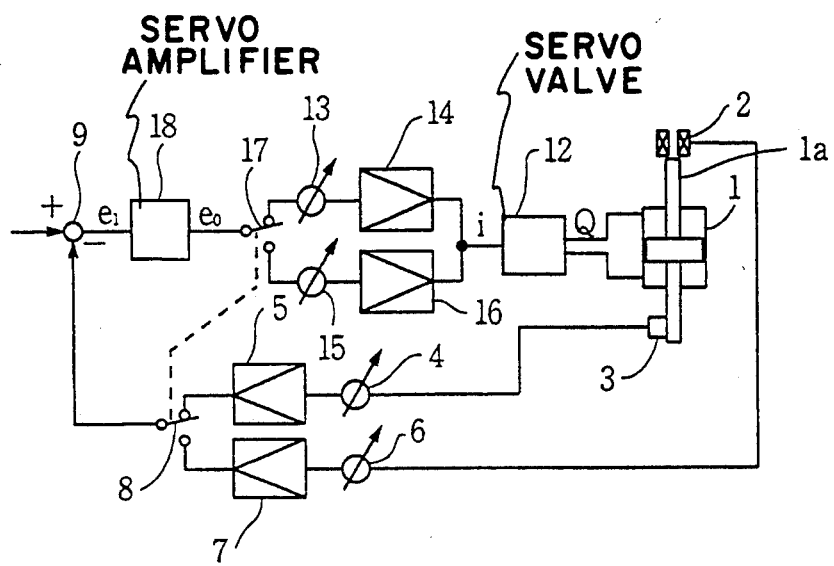
FIG. 6 shows a conventional hydraulic control system.

FIGS. 3 to 5 show various modifications of the hydraulic circuit in the hydraulic control system of the present invention. In the modification shown in FIG. 3, the opening degrees of the electromagnetic valves 21 to 24 are all the same. However, the diameter of each branch passage differs from those of other passages, so that the oil is adapted to flow through each branch passage at rates in the ratio 8:4:2:1. The system is operated in the same manner as the first embodiment.

Referring to FIG. 4, the oil is applied from an oil reservoir 38 to each branch passages 34 to 37 through the first passage 32 having an oil pump 39. The first branch passage 37 is divided into a return passage 37a which is communicated with the oil reservoir 38, and a branch passage 37b which is communicated with the second passage 33 through branch passages 36b and 35b, connected at junctures D, E and F. Similarly, the second and third branch passages 36 and 35 are branched at points B and C, thereby forming return passages 36a, 35a, respectively, which are communicated with the oil reservoir 38. The branch passage 36b is connected to the third branch passage 35 at juncture E and branch passage 35b is connected to the fourth branch passage 33 at juncture F. The second passage 33 is communicated with the cylinder 20 of the actuator 19 shown in FIG. 1. The diameters of the branch passages and the opening degrees of valves 21 to 24 provided in the branch passages are equal to those of one another.

The operation of the system is described hereinafter. The system is arranged such that the pressures in opposite passages at each branch point are equal with each other. The electromagnetic valves 21 to 24 are applied with control signals a to d, respectively from the control unit 50 shown in FIG. 1.

If the quantity of oil fed to the passage 32 is expressed as 1, when only the valve 21 is opened, the whole quantity 1 is applied to the cylinder 20 through the branch passage 34 and the passage 33. When only the valve 22 is opened, the oil is divided at the branch point C so that one-half of the oil flowing through the branch passage 35 returns to the oil reservoir 38. Thus, the quantity of oil applied to the cylinder 20 is one-half of the quantity fed to the passage 32.

When only the valve 23 is opened, the oil passing through the branch passage 36 is divided at the branch point B. One-half of the oil returns to the reservoir 38 through the return passage 36a. The remaining other half which passes through the branch passages 36b and 35 is further divided at the branch point C, thereby applying a quarter of the oil applied to the passage 32 to the cylinder 20. Similarly, by opening only the valve 24, the oil is divided three times at the point A, B and C, one-eight of the oil is applied to the cylinder 20. When the valves 23 and 24 are simultaneously opened, 3/16 (($\frac{1}{2} \times \frac{1}{2} + \frac{1}{2}) \cdot \frac{1}{2} \cdot \frac{1}{2}$) of the oil applied to the passage 32 is fed to the cylinder 20.

Thus by controlling the valves, the quantity of oil applied to the cylinder 20 can be variously controlled.

In the system of FIG. 5, the return passages 35a, 36a and 37a have respective projections 43, 44 and 45 on the inner walls thereof adjacent the exit openings so as to equalize the opposite pressures at each branch point. On the other hand, nonreturn valves 40, 41 and 42 are provided in the branch passages 35b, 36b and 37b, downstream of the branch points, C, B and A, respectively, to prevent the entry of the oil into the passages 35b, 36b and 37 from the branch passages 34, 35 and 36, respectively. As a result, the oil is accurately divided.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A hydraulic control system for controlling an actuator having a cylinder and a piston, the hydraulic control system having an oil pump, a first passage communicated with an oil reservoir through the oil pump, a second passage communicated with the cylinder of the actuator, comprising:

a plurality of branch passages connected in parallel between the first and second passages;

an electromagnetic valve provided in each branch passage for controlling flow rate of oil passing therethrough;

means for changing the flow rate in each branch passage;

detecting means for detecting moving distance of the piston and for producing a digital distance signal representing a detected moving distance;

flow rate control means responsive to the digital distance signal from the detecting means for producing digital control signals for operating said electromagnetic valves in such a manner that ratios among the flow rates at every branch passage becomes $2^n$, thereby moving the piston a desired distance at controlled speeds, wherein n equals 0, 1, 2, 3.

2. A control system according to claim 1 wherein said changing means comprises the electromagnetic valves having differing flow rates.

3. A control system according to claim 1 wherein said changing means comprises the branch passages having differing diameters.

4. A control system according to claim 1 wherein said changing means comprises a return passage connected between branch passages and the oil reservoir.

* * * * *